March 6, 1945. W. B. FLANDERS 2,370,854
BEARING APPARATUS
Filed Oct. 14, 1943 2 Sheets-Sheet 2

INVENTOR
WARREN B. FLANDERS
BY
ATTORNEY

Patented Mar. 6, 1945

2,370,854

UNITED STATES PATENT OFFICE 2,370,854

BEARING APPARATUS

Warren B. Flanders, Philadelphia, Pa., assignor to Westinghouse Electric & Manufacturing Company, East Pittsburgh, Pa., a corporation of Pennsylvania Application October 14, 1943, Serial No. 506,143

9 Claims. (Cl. 308—134.1)

The invention relates to an assembly wherein a pair of spaced bearings carrying a member having overhanging ends for connection to overhanging driving and driven elements and it has for an object to provide for radial support of the bearings by a suitable body member and for axial support of the assembly by one of the bearings.

A further object of the invention is to support a suitable member both radially and axially by a pair of bearings, to support the bearings radially by a suitable body construction, and to support one of the bearings axially from the other by means of a connecting tubular element so that said other bearing may be connected to the body construction for axial support of the bearing and tubular element assembly.

A further object of the invention is to provide bearings for supporting axial and thrust loads of a drive shaft and arranged so as to facilitate relative adjustments for desired thrust bearing clearance and drive shaft axial location.

In the application of Schmidt, Serial No. 506,155, filed October 14, 1943, there is disclosed and claimed a vertical blower provided with a vertical drive shaft with overhung turbine and propeller elements and having improved means for supporting and lubricating the bearings and for sealing the reservoir against escape of oil due to suction effects; and, in the application of Ponomareff, Serial No. 507,085, filed October 21, 1943, there are disclosed and claimed improved structural features, the provision of means for forcibly lubricating the bearings and including a tubular element connecting the latter so as to supply oil escaping from the upper end of the lower bearing to the lower end of the upper bearing, improved self-contained means for cooling the oil, and improved means for furnishing air to the sealing device. In accordance with the present invention, the bearings are connected by a tubular element with adjustment to provide the desired thrust bearing clearance. In addition, provision is made for adjustment of the assembly as a whole to secure a desired axial location of the drive shaft. Accordingly, a further object of the invention is to provide a bearing assembly having these advantageous features.

Figure 1:
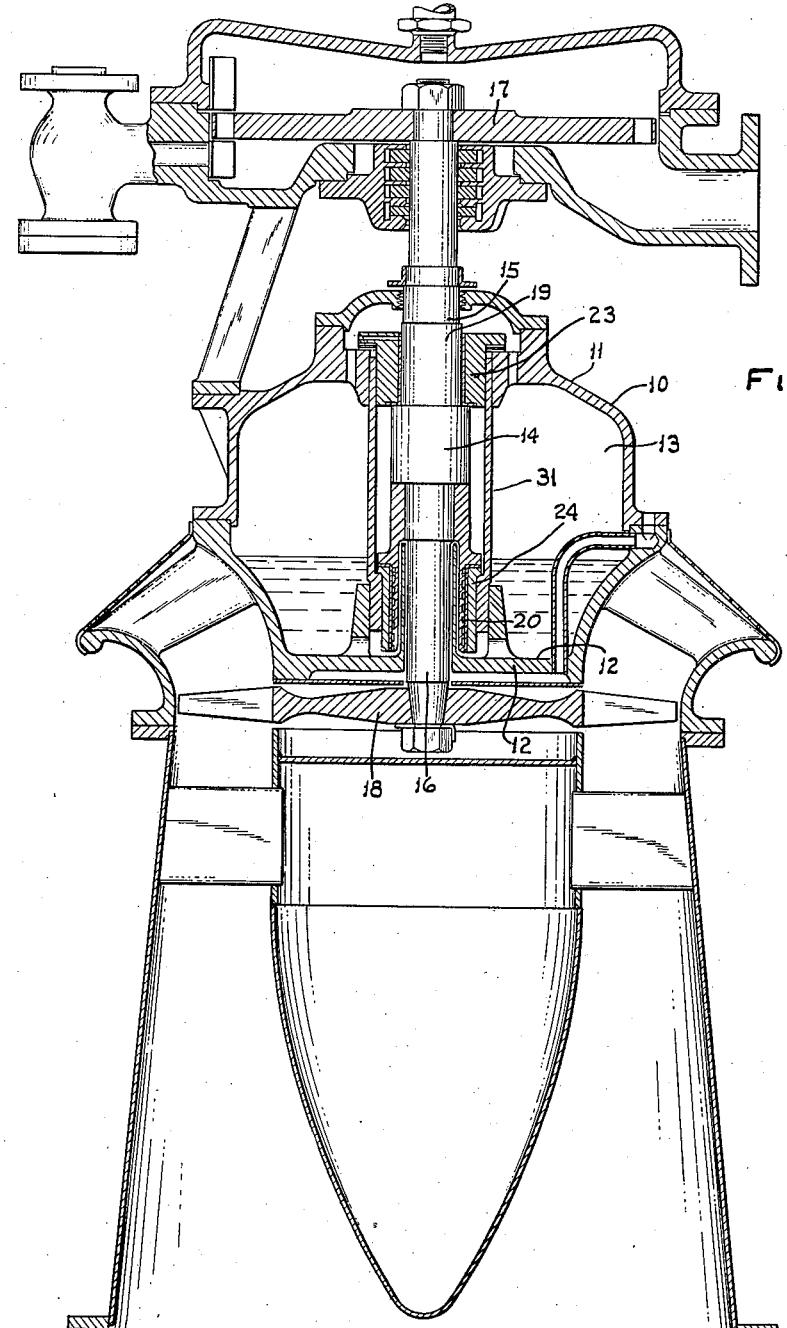
Figure 2:
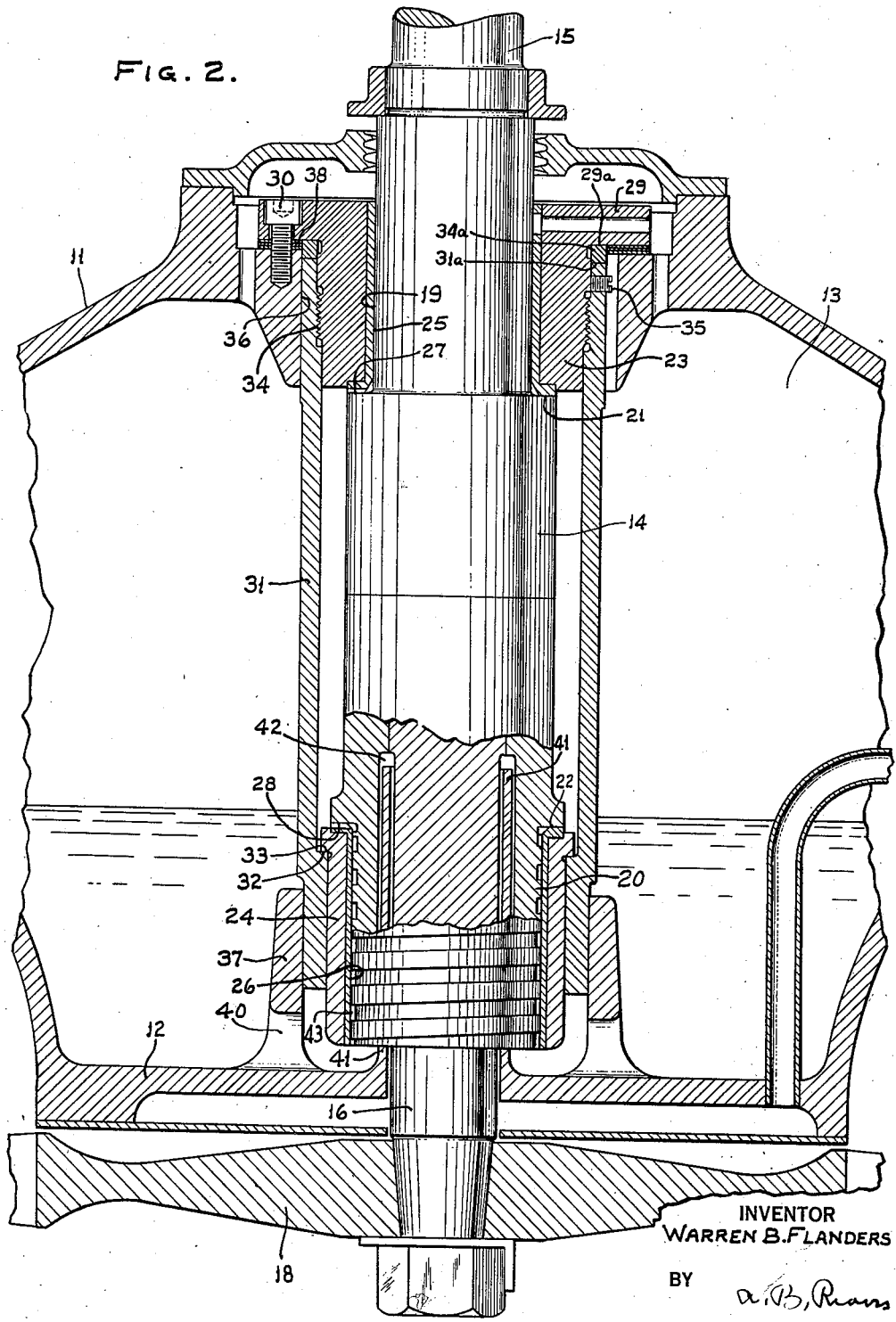

These and other objects are effected by the invention as will be apparent from the following description and claims taken in connection with the accompanying drawings, forming a part of this application, in which:

Fig. 1 is a vertical sectional view of a blower incorporating the improved bearing assembly; and Fig. 2 is a sectional view, drawn to larger scale, and showing the bearing assembly in detail.

Referring to the drawings, there is shown a blower having a body member 10 including opposed walls 11 and 12 defining an interior chamber 13 for lubricating oil. A drive shaft 14 extends through the chamber and the walls 11 and 12 so that its end portions 15 and 16 overhang the latter. A motor rotor 17 and a propeller 18 are attached to the overhanging end portions 15 and 16.

The drive shaft has journal portions 19 and 20 separating thrust abutments 21 and 22 from the end portions 15 and 16.

Bearings 23 and 24 have bearings surfaces 25 and 26 cooperating with the journal portions 19 and 20 and thrust surfaces 27 and 28 cooperating with thrust abutments 21 and 22. The bearings are supported axially from the wall 11 and radially by both the walls 11 and 12.

To provide for axial support, the bearing 23 has a flange 29 attached by screws 30 to the wall 11 and the bearing 24 is supported and spaced from the bearing 23 by a sleeve element 31. One end of the sleeve element has an interior shoulder 32 for engagement with an external shoulder 33 formed on the bearing 24 and the other end is connected by threads 34 to the bearing 23. Thrust of the drive shaft 14, in one direction, is imposed directly thereby on the bearing 23 and transmitted therefrom to the body member wall 11, and thrust, in the other direction, is imposed on the bearing 24 and transmitted from the latter through the engaging shoulders to the sleeve element and from the latter to the wall 11 through the bearing 23. By effecting suitable adjustment of the thread connection 34, the bearings may be located axially for the proper thrust bearing running clearance. A set screw 35 provides for locking of the bearing 23 and the sleeve element after the required adjustment is made.

In assembling, the bearing 23 and the sleeve 31 are turned relatively to bring the thrust surfaces 27 and 28 firmly into engagement with the shaft thrust abutments 21 and 22 and the clearance between the upper end 31a of the sleeve and the opposed surface 29a of the flange 29 is measured. A spacer ring 34a has its axial dimension formed to suit the measured clearance increased by a small amount for bearing running clearance. The sleeve and the bearing are then screwed together until the spacer ring firmly engages the surfaces 31a and 29a, whereupon the set screw 35 is tightened. Thus, in manufacture, the bearing running clearance is accurately provided for with assurance that, in final assembly and reassembly at any later time, such clearance will be preserved.

Radial loads of the bearings 23 and 24 are carried by the opposed walls 11 and 12. The wall 11 has an opening 36 fitting the bearing 23, or the portion thereof telescoped by the sleeve, circumferentially and an annular member 37 integral with the other wall 12 affords radial support for the bearing 24 while permitting of axial adjustment thereof. Thus, it will be seen that, for a given axial position of the bearing 23, the telescopic or guided radial support for the bearing 24 allows whatever axial movement of the latter may be required incident to adjustment of the threaded connection 34 for the required thrust bearing running clearance.

In addition to the adjustment for thrust bearing clearance, there is also provided an adjustment which is effective to position the drive shaft axially. To this end, shims 38 are shown arranged between the flange 29 and the wall 11, the shims being held in compression by means of the screws 30. By increasing the number of shims, the drive shaft may be axially adjusted in one direction and decreasing the number thereof provides for adjustment in the other direction. This is desirable particularly where the drive shaft is attached to a part, such as a turbine rotor, requiring axial location within close limits.

The lower ends of the bottom journal portion 20 and bearing 24 are spaced above the oil reservoir bottom surface provided by the lower wall 12, so that the oil may have access thereto through openings 40 provided in the annular member 37. The lower wall drive shaft opening is bordered by an upright integral sleeve element 41 providing a dam for retaining oil in the reservoir, the sleeve element extending within a channel 42 of annular section formed in the drive shaft and extending upwardly from the lower end of the journal portion. The lower journal portion has a shallow helical groove 43 open to the reservoir at its lower end and cooperating with the lower bearing to provide a viscosity pump for supplying oil to both bearings, oil being passed through the lower bearing and then through the tubular element to the upper bearing from whose upper end oil drains by gravity back to the reservoir. Thus, it will be seen that the structure, the annular element or guide 37 and the lower end of the tubular element fitting therein, affords radial support for the lower bearing and telescopes or overlaps the latter with the result that there is provided a nested construction of minimum axial length.

While the invention is shown as applied to a vertical blower, it will be apparent that it is susceptible of general application irrespective of the direction of the axis.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In apparatus of the character described, a body member having first and second opposed ends; an assembly including stationary and moving components; said moving component comprising a rotary member extending through the body member, having first and second end portions overhanging the first and second ends of the latter, and having oppositely-facing thrust abutments separated by journal portions from the first and second overhanging end portions; said stationary component comprising first and second bearings having bearing surfaces cooperating with the journal portions and the thrust abutments and a tubular tension member connecting the bearings; means for supporting the stationary component radially with respect to the ends of the body member and including a guide at the second end of the body member providing for guided axial movement at that end of the component; and means for axially supporting the stationary component with respect to the first end of the body member.

2. The combination as claimed in claim 1 wherein the first bearing of the stationary component fits an opening formed in the first end of the body member and has a flange attached to the latter, and wherein the tubular tension member telescopes over the second bearing and fits within a guide carried by the second end of the body member.

3. In apparatus of the character described, a body member having supporting walls at opposite first and second ends thereof; an assembly including stationary and moving components; said moving component comprising a rotary member extending through the body member, having end portions which overhang the ends of the latter, and having oppositely-facing thrust abutments separated by journal portions from said end portions; said stationary component having first and second ends and including bearings provided with bearing surfaces cooperating with the journal portions and the thrust abutments and a tubular element encompassing the rotary member and supporting one bearing from the other; means effective in an axial direction for fixedly securing the first end of the stationary component to the first supporting wall; and means for supporting said stationary component radially with respect to both supporting walls and including an axial guide carried by the second supporting wall.

4. The combination as claimed in claim 3 wherein the supported bearing and the tubular element are joined by a threaded connection with a spacing member clamped therebetween and whose spacing dimension is that with the thrust surfaces of the bearings firmly engaging the abutments increased by a small amount for thrust bearing running clearance.

5. In apparatus of the character described, a body member having first and second supporting walls at opposite ends thereof; an assembly including stationary and moving components; said moving component comprising a rotary member having end portions which overhang the upper and lower ends of the body member and having journal portions separating the thrust abutments from the end portions; said stationary component having first and second ends and including first and second bearings having bearing surfaces cooperating with the journal portions and the thrust abutments, a tubular element effective in an axial direction for supporting the second bearing from the first, and a flange carried by the first end of the stationary component and overlapping the first supporting wall; means effective in an axial direction for fixedly securing the flange to the first wall and including spacing means of variable thickness interposed between the flange and the wall together with screw means for connecting the flange and the wall; and means for supporting said stationary component radially with respect to the first and second walls and including a guide carried by the second wall and providing for relative axial movement of such component.

6. The combination as claimed in claim 5 wherein the flange is integral with the first bearing and the latter and the tubular element are joined by a threaded connection with a spacing member clamped therebetween and whose spacing dimension is that with the thrust surfaces of the bearings firmly engaging the abutments increased by a small amount for thrust bearing running clearance.

7. In apparatus of the character described, a body member having supporting walls at the upper and lower ends thereof; a vertical drive shaft assembly including stationary and moving components; said moving component comprising a drive shaft having end portions overhanging the upper and lower walls of the body member and having oppositely-facing thrust abutments separated by journal portions from the overhanging end portions; said stationary component including upper and lower bearings having bearing surfaces cooperating with the journal portions and the thrust abutments, a tubular member having an internal shoulder engaging underneath an external shoulder on the lower bearing and having a threaded connection with respect to the upper bearing; means effective in an axial direction for fixedly securing the stationary component to the upper wall; and means for supporting said stationary component radially with respect to the supporting walls and including a guide carried by the lower wall and telescoping the lower end of the tubular member.

8. The combination as claimed in claim 7 wherein the upper bearing has a flange attached to the upper wall with shims interposed and wherein the threaded connection between the tubular element and the upper bearing is arranged internally of the former and externally of the latter so that the tubular element may fit a suitably formed opening in the upper wall to provide radial support by the latter of the stationary component with a spacing member clamped between the flange and the adjacent end of the tubular element and whose spacing dimension is that with the thrust surfaces of the bearings firmly engaging the abutments increased by a small amount for thrust bearing running clearance together with means for locking together the bearing and the tubular element spaced by the spacing member.

9. In apparatus of the character described, a body member provided with an interior lubricating oil chamber having upper and lower walls; a vertically-disposed drive shaft assembly including stationary and moving components; said moving component comprising a drive shaft having upper and lower end portions overhanging the upper and lower walls of the body member, oppositely-facing thrust abutments, and journal portions separating the latter from the end portions; said stationary component comprising upper and lower bearings having bearing surfaces cooperating with the journal portions and the thrust abutments; and a tubular element having an internal shoulder at its lower end fitting underneath an external shoulder on the lower bearing and having an internal thread at its upper end engaging a thread formed on the upper bearing; means for supporting the bearings radially with respect to the upper and lower walls of the body member and comprising an opening formed in the upper wall and fitting the upper bearing circumferentially and a guide carried by the lower wall and telescoping over the lower end of the tubular member to provide for relative axial movement of the latter; a flange formed on the upper bearing and attached to the upper wall; said supporting means for the lower bearing being constructed and arranged to provide for access of oil from the chamber to the lower end of the latter; and means including the lower bearing and the tubular element to secure circulation of lubricating oil from the chamber in series through the lower bearing, then through the upper bearing and from the latter back to the chamber.

WARREN B. FLANDERS.